Sept. 6, 1949. J. M. DAVIES 2,480,908
SEAL
Filed June 7, 1945 2 Sheets-Sheet 1

INVENTOR.
James M. Davies
BY Charles M. Fryer
ATTORNEY.

Sept. 6, 1949.          J. M. DAVIES                2,480,908
                          SEAL
Filed June 7, 1945                          2 Sheets-Sheet 2
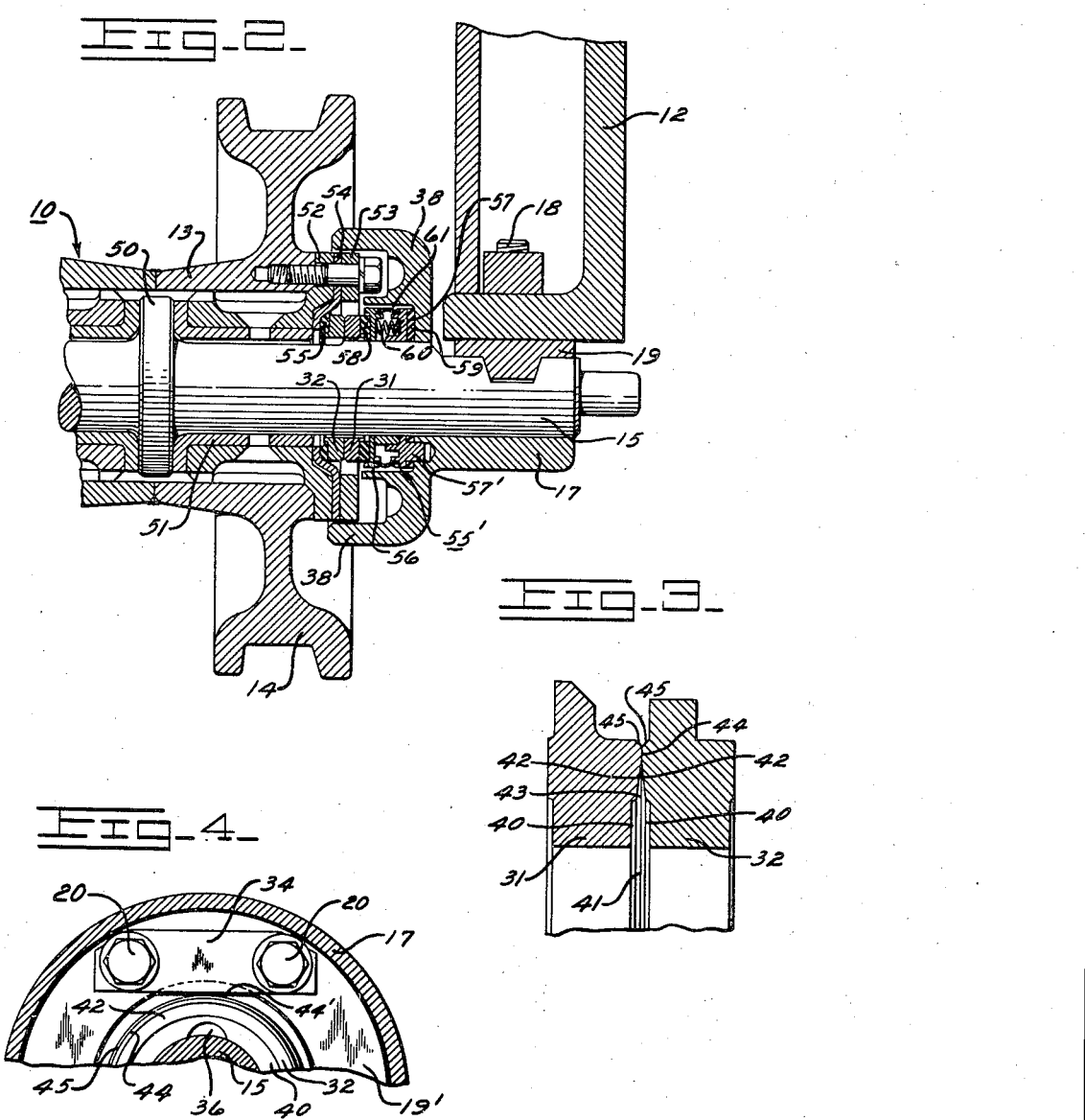
INVENTOR.
James M. Davies
BY
Charles M. Fryer
ATTORNEY.

Patented Sept. 6, 1949

2,480,908

UNITED STATES PATENT OFFICE 2,480,908

SEAL

James M. Davies, Peoria, Ill., assignor to Caterpillar Tractor Co., San Leandro, Calif., a corporation of California Application June 7, 1945, Serial No. 598,147

2 Claims. (Cl. 286—11)

This invention relates to seals and particularly to seals employed for retaining lubricant in and excluding foreign matter such as dust and other abrasive substances from the vicinity of bearing surfaces between relatively movable parts.

For the purpose of illustration, the invention is disclosed herein as applied to the track roller of a track-type tractor. Such track rollers are subjected to extremely heavy duty in an environment of dust, mud, sand or other substances of abrasive nature and therefore present an unusually difficult problem in lubrication of and exclusion of foreign substances from their bearing surfaces. This disclosure is not to be taken, however, as limiting the invention to the particular structure shown as the invention is capable of use in many forms and in combination with various structures as will become apparent from the following description.

It is common practice to provide a seal between relatively rotating parts, such as a shaft and wheel, to retain lubricant in the area of the bearing surfaces of such parts and also to exclude foreign substances which mix with and destroy the efficiency of the lubricant and some of which abrade the bearing surfaces. Soft and resilient members are most commonly employed for forming such seals though the advantages of hard, smooth contacting surfaces generally referred to as "metal to metal seals" has been recognized. Conventional metal to metal seals usually employ opposing relatively rotatable surfaces ground flat for face to face contact and it is intended that the closeness of such contact be sufficiently perfect to prevent escape of lubricant in one direction and entrance of undesirable matter in the opposite direction. Such seals present the disadvantage that in the closeness of contact required to prevent escape of lubricant, they also prevent the introduction of any lubricant between their contacting surface with the result that they wear rapidly from a dry grinding action, and when wear takes place, foreign abrasives are admitted to the area between their surfaces to increase the rate of wear and soon completely to destroy the effectiveness of the seal.

It is therefore one of the objects of the present invention to provide an improved seal and to provide a seal of the metal to metal type in which the contacting relatively rotatable surfaces may be ground to extremely close tolerances to provide a good fit and an effective closure but also to insure an adequate supply of lubricant to such surfaces to protect them from wear or destruction by erosive or abrasive action. A further object of the invention is the provision of a seal of the metal to metal type wherein a lubricant is drawn or fed to the sealing surfaces by a capillary attraction provided by the configuration of the members upon which the sealing surfaces are formed. A still further object of the invention is the provision of a seal of the kind described which includes means to prevent the passage of lubricant between the sealing faces upon the event of excessive lubricant pressure. A further object of the invention is to provide a pair of seal parts in flat face to face sealing contact with areas adjacent the contacting areas tapered away from each other at a very small angle so that upon wearing or lapping of the contacting flats they will extend or regenerate themselves to compensate for their gradual destruction due to erosive action. Still further objects and advantages are made apparent in the following detailed description of the invention wherein reference is made to the accompanying drawings.

In the drawings:

Fig. 2 is a similar view of one-half of a track roller of slightly different construction and illustrates a modified form of the seal shown in Fig. 1;

Fig. 3 is an enlarged fragmentary sectional view of the sealing members shown in Fig. 1 illustrating by exaggeration the configuration of the opposed or contacting faces of said members; and Fig. 4 is a fragmentary sectional view taken along the line 4—4 of Fig. 1.

Figure 1:
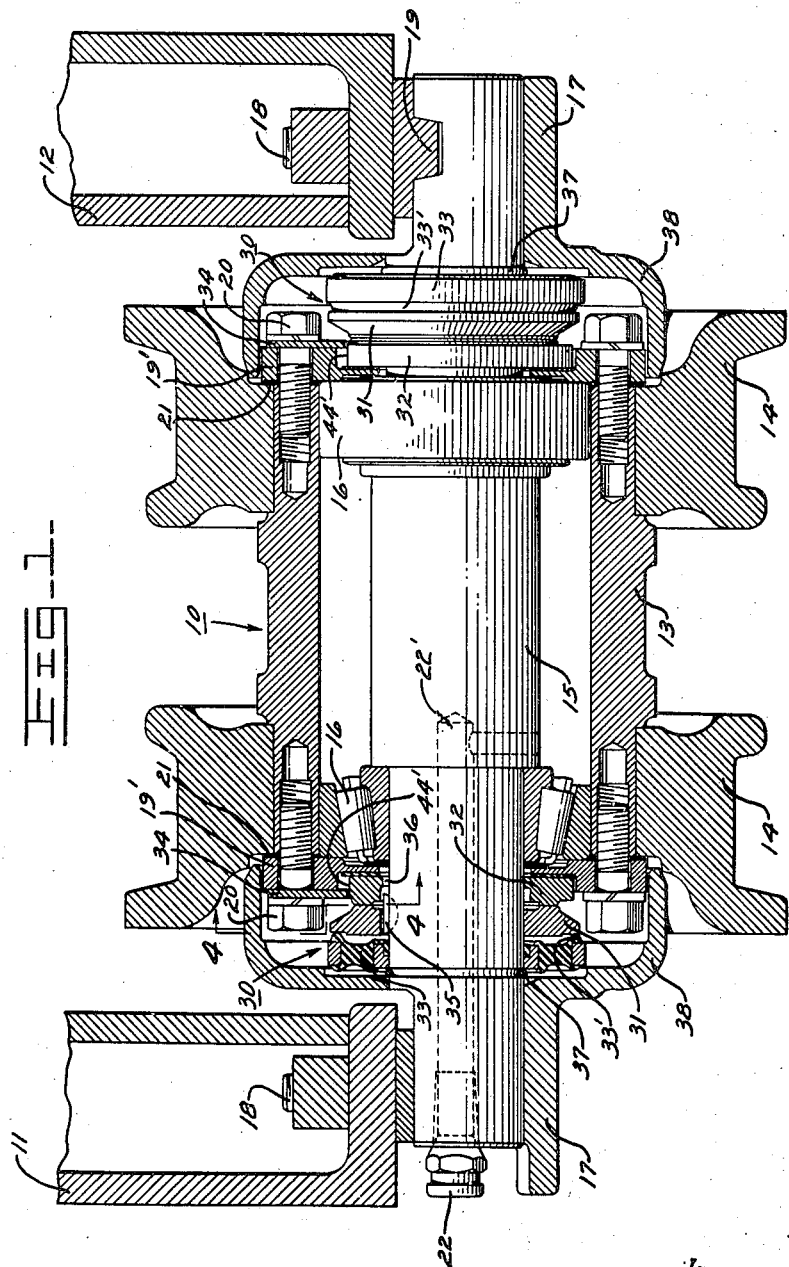
Fig. 1 is a vertical sectional view of a track roller for a track-type tractor illustrating the disposition of anti-friction bearings therein and showing the application thereto of a seal constructed in accordance with the present invention.

In Fig. 1, a track roller is generally indicated at 10 and this roller is of the kind employed on track-type tractors in which an endless track is continuously laid upon the ground by a driving wheel or sprocket which at the same time drives the tractor forwardly, while the principal weight of the tractor is supported by rollers, such as shown at 10, which ride over suitable track elements formed on the inside of the endless track. The roller 10 is one of several which are supported for operation between frame members shown at 11 and 12, a pair of which members is disposed at each side of the tractor as is conventional practice. The roller herein disclosed comprises a hollow hub 13 and track engaging rims 14 securely fitted to opposite ends thereof. A non-rotatable shaft 15 extends through the hub 13 and anti-friction bearings 16 are disposed between the shaft and the interior of the hollow hub to facilitate rotation of the roller. The shaft 15 is secured at its opposite ends to the truck frame members 11 and 12 by collars shown at 17 which embrace the ends of the shaft and are in turn secured to the members 11 and 12 as by cap screws indicated at 18. One of the collars may be provided with an internally formed key 19 registering with a recess in the shaft as illustrated in Fig. 1 to prevent the shaft from moving laterally with respect to the frame members 11 and 12. The bearings 16 are fitted on the shaft 15 and retained and properly positioned within the hub 13 by means of rings 19' secured to the ends of the hub by cap screws 20. Shims 21 may be employed between the rings 19' and the ends of the hub 13 to facilitate properly locating the members 19'.

The interior of the hub 13 between the bearings 16 acts as a reservoir for bearing lubricant which may be introduced thereto through a conventional lubricant fitting 22 and suitable passages formed in the shaft 15 as indicated in dotted lines at 22'.

Lubricant is retained within the reservoir provided by the hollow shaft 13 which also includes the bearings to be lubricated, and foreign substances are prevented from entering said reservoir to deteriorate the lubricant or injure the bearings by means of seals provided one at each end of the hub. Each of the seals comprises a pair of annular metal sealing rings 31 and 32 with engaging relatively rotatable faces pressed into sealing engagement with each other by a resilient pressure member illustrated at 33. While the members 31 and 32 are shown and described herein as formed of metal and the seal afforded by such members is referred to as one of metal to metal contact, it is to be understood that glass or any other relatively hard substance may be substituted for metal in this use and that the expressions "metal," or "metal to metal seal" as herein used are employed as defining a seal wherein the perfect formation of relatively hard contacting faces is relied upon to provide a seal as distinguished from seals wherein soft or resilient materials are used and the tendency of the material to shape itself or expand into sealing contact is relied upon.

The pressure ring 33 illustrated in Fig. 1 comprises an annular member of rubber or other resilient material, preferably reinforced at its inner and outer edges by metal rings as shown. The ring 33 functions to engage the outermost sealing ring 31 to urge it into sealing contact with the opposed sealing ring 32. An inwardly projecting lip 33' forms the point of engagement between the pressure ring 33 and the seal member 31 and also forms a seal which normally prohibits escape of lubricant from the reservoir but which also serves as an outlet for lubricant in the event of excessive pressure within the reservoir so that the lubricant will not escape from between the contacting faces of the sealing members 31 and 32 and momentarily destroy the seal which is provided at these faces. The sealing ring 32 is keyed for rotation with the roller by means of a flat plate 34, also shown in Fig. 4, which registers with a flat portion 44' on the ring and is held in place by two of the cap screws 20. The seal ring 31 is secured against rotation but permitted to move laterally with respect to the non-rotatable shaft 15 by means of a Woodruff key conventionally employed as indicated at 35. Lubricant from the reservoir flows freely through the bearings 16 and to the space between the sealing rings 31 and 32 through a notch 36 (see Figs. 1 and 4) formed in the ring 32. It may also flow to the space between the outer sealing ring 31 and the pressure ring 33 through the slot in the ring 31 which accommodates the Woodruff key 35. The pressure ring 33 is held in position on the shaft 15 with its lip 33' in engagement with the outer seal ring 31 by a snap ring 37 which fits a groove in the shaft 15 in a conventional manner. In the event of excessive pressure of lubricant within the reservoir, this pressure is exerted equally between the seal rings 31 and 32 and between the pressure ring 33 and the seal ring 31. The construction of these members is, however, such that excessive lubricant pressure will be relieved under the lip 33' where it contacts the seal ring 31 rather than between the seal rings. This prevents any spreading apart of the seal rings which might admit foreign substances between their sealing surfaces and is accomplished by the shapes of the seal rings and pressure ring which afford a greater area for the application of pressure between the pressure ring and the outer seal ring 31 than that which exists between the seal rings 31 and 32. Consequently, the same pressure existing at both points has greater piston like surfaces against which to react in the outer space between the pressure ring and seal ring 31 than it has in the inner space between the two seal rings. Through this construction, the seal ring acts as a pressure relief member in the event of excessive lubricant pressure such as may be caused when lubricant is being supplied to the reservoir through the fitting 22 and excess lubricant escapes from beneath the pressure ring rather than from between the sealing members.

The seal assembly which includes the rings 31 and 32 and the pressure ring 33 is protected against any large particles of rock or large quantities of sand, dust or other abrasive matter by shrouds 38 formed integrally with the collars 17 in which the shaft 15 is supported. These shrouds are, however, not intended to exclude all foreign substances but do serve to maintain the exterior surfaces of the assembly relatively clean.

Two of the principal problems which are presented in connection with ordinary types of metal to metal seals are, first, that it is very difficult to form a perfectly flat surface on sealing members at their areas of contact with each other and, second, when such surfaces are formed, it becomes difficult to lubricate them as if they are sufficiently flat and in sufficiently perfect contact to exclude abrasives and other undesirable substances, they also tend to exclude lubricant from their contacting surfaces which is necessary to prevent dry grinding and consequent wear during their relative rotation. Both of these disadvantages are overcome by the particular construction of the seal of the present invention which is best illustrated in Fig. 3 of the accompanying drawings wherein a cross section of the sealing members 31 and 32 is illustrated in exaggerated detail. In Fig. 3, the sealing members 31 and 32 are shown as having their opposed faces relieved or cut away as at 40 to leave only an annulus of necessary width on each sealing member for satisfactory operation when they are brought together. This also provides a recess 41 of substantial width for the reception of lubricant to a position closely adjacent the contacting surfaces of the seal. Radially outward from the recess 41 each of the sealing members is ground to a tapered contour as indicated at 42 to provide the recess 43 which forms a narrow channel for the reception of lubricant communicating between the recess 41 and the sealing faces which are in contact at 44.

The sealing faces at 44 are very narrow and are therefore more easily formed than the wider faces of conventional seals. The tapered groove 43, which diminishes in width as it approaches the contacting surfaces, is also very narrow so that it provides a capillary groove which creates a tendency of the lubricant to flow radially outward. This tendency, together with the relative movement of the seal rings 31 and 32, insures a constant supply of lubricant to the contacting faces of the seal in a quantity sufficient to insure adequate lubrication of such faces but insufficient to permit any undesirable excess of lubricant to escape to the exterior of the sealing members from between their contacting faces.

The illustration of Fig. 3 is, as has been stated, an exaggerated illustration of the actual shape of the sealing members, particularly with respect to the taper of the faces 42. In order to give a better understanding of the actual construction than that disclosed by the drawing, though not to limit the invention to any particular dimensions or range of dimensions, the following specifications for a typical seal which has been found satisfactory in operation are set forth. The area of contact between the faces 44 constitutes an annulus several inches in diameter depending upon the structure for which the seal is designed. The width of this annulus of contacting faces is between one-sixteenth ($\frac{1}{16}$) and one-eighth ($\frac{1}{8}$) of an inch. The tapered portions 42 are also of annular configuration and may be a quarter ($\frac{1}{4}$) of an inch or more in width. The space between the faces 42, which is of capillary proportions, varies from something in the order of fifty to two hundred millionths of an inch at their inner edges where they are most widely spaced and gradually tapers to their outer edges where they merge with the contacting faces 44.

The angularity of this wedge-shaped space is perhaps best defined in terms of the ratio of the widest part of the wedge to the length of the wedge so that a wedge of fifty millionths of an inch at its widest part and a quarter of an inch in length has a ratio of 1 to 5000. If the width is two hundred millionths, the ratio becomes 1 to 1250. Thus an average ratio of width to length in the limits of the example given may be expressed in round figures as in the order of 1 to 3000. The latter faces are ground or lapped to substantially perfect flats with a tolerance preferably no greater than six millionths of an inch. This close tolerance is practically accomplished in hardened steel, glass or other hard materials by methods of grinding, lapping and finishing well known in the optical arts.

In practice, it is found desirable first to grind the tapered surfaces 42 throughout the full width of the opposing faces of the seals and then to provide the flats 44 either by grinding, lapping or other suitable methods. Chamfers 45 are preferably provided at the outer edges of the flats 44 in order to eliminate the possibility of burrs forming at these edges and also to prevent breaking down of the edges by corrosion or from other causes.

While the flats 44 are adequately lubricated in operation because of constant capillary feed of lubricant to their abutting faces, some wear may take place over a period of time but due to the fact that the flats are bounded on one side by the tapered surfaces 42, the enlargement of their width due to this wear will be negligible and a very narrow area of contact will always be maintained. However, a further advantage of the structure herein shown resides in the fact that any erosion of the flats which takes place normally at their outer peripheral margins to reduce the width of the contacting or sealing areas is automatically compensated because the flats regenerate themselves by extending their inner edges as the tapered faces 42 wear away. In fact, the flats may for practical purposes be said to remain substantially constant in area because as they are destroyed from their outer edges, the pressure per unit area on the sealing faces increases and the flats are lapped to increase their area by extension of their inner edges. In this way the sealing faces tend to remain constant in width by regenerating themselves at their inner edges at the rate that they are destroyed by erosion at their outer edges. The contacting faces 44 are herein shown as perfectly flat and disposed in a plane normal to the axis of rotation though it is foreseen that these surfaces may be formed on an angle to this normal plane so that the opposed sealing surfaces would be cone-like rather than perfectly flat.

A modification of the invention is illustrated in Fig. 2 wherein a slightly different roller and bearing construction is illustrated and wherein the rubber pressure ring is replaced by a pressure member employing coil springs for its resiliency. In this figure, the shaft 15 is secured to the truck frame portion 12 in the manner heretofore disclosed but is formed with a central thrust collar 50. The roller assembly has a sleeve type bearing 51 for rotation about the shaft with its inner ends in abutment with the collar 50. An outer flanged end 52 on a part of the bearing 51 is secured to the hub 15 by cap screws as shown, which cap screws also secure in place a backing plate 53 and a ring 54.

The sealing assembly of Fig. 2 employs the sealing members 31 and 32 substantially the same in construction as those illustrated in Fig. 1. The inner seal ring 31 may, however, be backed by a gasket 55 of resilient material, such as rubber, which may be bonded to the seal ring and engageable with the ring 54. The pressure ring generally indicated at 55' comprises a pair of spaced metal collars 56 and 57 which may be backed by rubber gaskets 58 and 59 respectively. The pressure ring may be held against rotation by a projection 57' on its member 57 received in a suitable opening in the inner end of the collar 17 as shown. A plurality of coil springs 60 are disposed between the members 56 and 57 to exert the necessary endwise pressure against the sealing members. A boot 61 of leather or other similar flexible material surrounds the springs 60 and is secured at its edges to the members 56 and 57 to prevent the escape of lubricant but to permit relative movement of said members as may be required by the flexibility of the springs 60.

Some of the advantages of the structure illustrated in Fig. 2 are that the rubber or resilient member 55 is bonded between the ring 54 and the sealing member 32 and thus forms a perfect seal between these members as well as a resilient support for the finely ground sealing member which protects it from shocks to which it might be subjected during assembly. Machining the face of the sealing member 32 is also simplified because of the connection between it and the ring 54 which is provided by the bonded resilient member 55. With the construction shown in Fig. 2, the face of the sealing member 32 may be set up for grinding or surfacing without first machining its back surface to a flat finish. The same advantages may be obtained by bonding the gasket 58 to the sealing member 31 and collar member 56 between which it is disposed.

I claim:

1. In a seal of the character described, a pair of relatively rotatable annular sealing members having flat annular abutting faces in sealing contact and annular areas adjacent said faces sloping away from the plane of their abutment gradually to provide a wedge shaped space between the members converging toward the area of sealing contact, the ratio of the widest part of the wedge shape of said space to its length being in the order of 1 to 3000.

2. In a seal for separating a lubricated area from an area apt to contain abrasive matter, a pair of relatively rotatable annular sealing members having flat annular abutting faces in sealing contact and annular areas adjacent said faces sloping away from the plane of their abutment gradually to provide a wedge shaped space between the members converging toward the area of sealing contact, the ratio of the widest part of the wedge shape of said space to its length being between 1 to 1250 and 1 to 5000, and said wedge shaped space communicating with the lubricated area.

JAMES M. DAVIES.

REFERENCES CITED

The following references are of record in the file of this patent:

UNITED STATES PATENTS

| Number | Name | Date |
| --- | --- | --- |
| 1,618,655 | Halvorsen | Feb. 22, 1927 |
| 1,931,733 | Leibing | Oct. 24, 1933 |
| 2,100,220 | King | Nov. 23, 1937 |
| 2,264,739 | Boden | Dec. 2, 1941 |
| 2,326,489 | Payne | Aug. 10, 1943 |
| 2,326,824 | Browne et al. | Aug. 17, 1943 |
| 2,395,095 | Brady | Feb. 19, 1946 |